United States Patent [19]

Prosise et al.

[11] Patent Number: 5,763,554
[45] Date of Patent: Jun. 9, 1998

[54] DENTURE ADHESIVE

[75] Inventors: William E. Prosise, Ramsey; Yoon Tae Kwak, Wayne, both of N.J.

[73] Assignee: ISP Investments Inc., Wilmington, Del.

[21] Appl. No.: 730,507

[22] Filed: Oct. 11, 1996

[51] Int. Cl.$^6$ .................... C08F 222/06; C08F 216/12
[52] U.S. Cl. .................. 526/271; 523/120; 523/118
[58] Field of Search .................... 523/120, 118; 526/271

[56] References Cited

U.S. PATENT DOCUMENTS

| | | | |
|---|---|---|---|
| 4,373,036 | 2/1983 | Chang et al. | 523/118 |
| 5,567,787 | 10/1996 | Kwak et al. | 526/271 |

*Primary Examiner*—Vasu Jagannathan
*Assistant Examiner*—Olga Asinovsky
*Attorney, Agent, or Firm*—Walter Katz; Marilyn J. Maue; William J. Davis

[57] ABSTRACT

This invention relates to an improved denture adhesive composition having extended holding power accompanied by adhesion building properties during use and having increased gel adhesion, which composition consists essentially of (a) from about 10 to about 35 wt. % lower alkyl vinyl ether-maleic acid copolymer wherein from 0 to about 90 wt. % of the copolymer carboxyl units are converted to a mixture of salts selected from the group of calcium, sodium, strontium, aluminum, zinc, magnesium and potassium; (b) 10–35 wt. % of a crosslinked terpolymer of alkyl vinyl ether, maleic anhydride and a $C_{16}$–$C_{20}$ alkyl acrylate or methacrylate, or vinyl ether; crosslinked with a $C_6$–$C_{14}$ diene, e.g. 9-decadiene, and their salts; (c) 10–35 wt. % of a cohesive agent; in a weight ratio of between about 2:1 and about 1:2 with respect to the copolymer; and (d) from about 30 to about 70 wt. % of an oil base as a carrier.

5 Claims, 1 Drawing Sheet

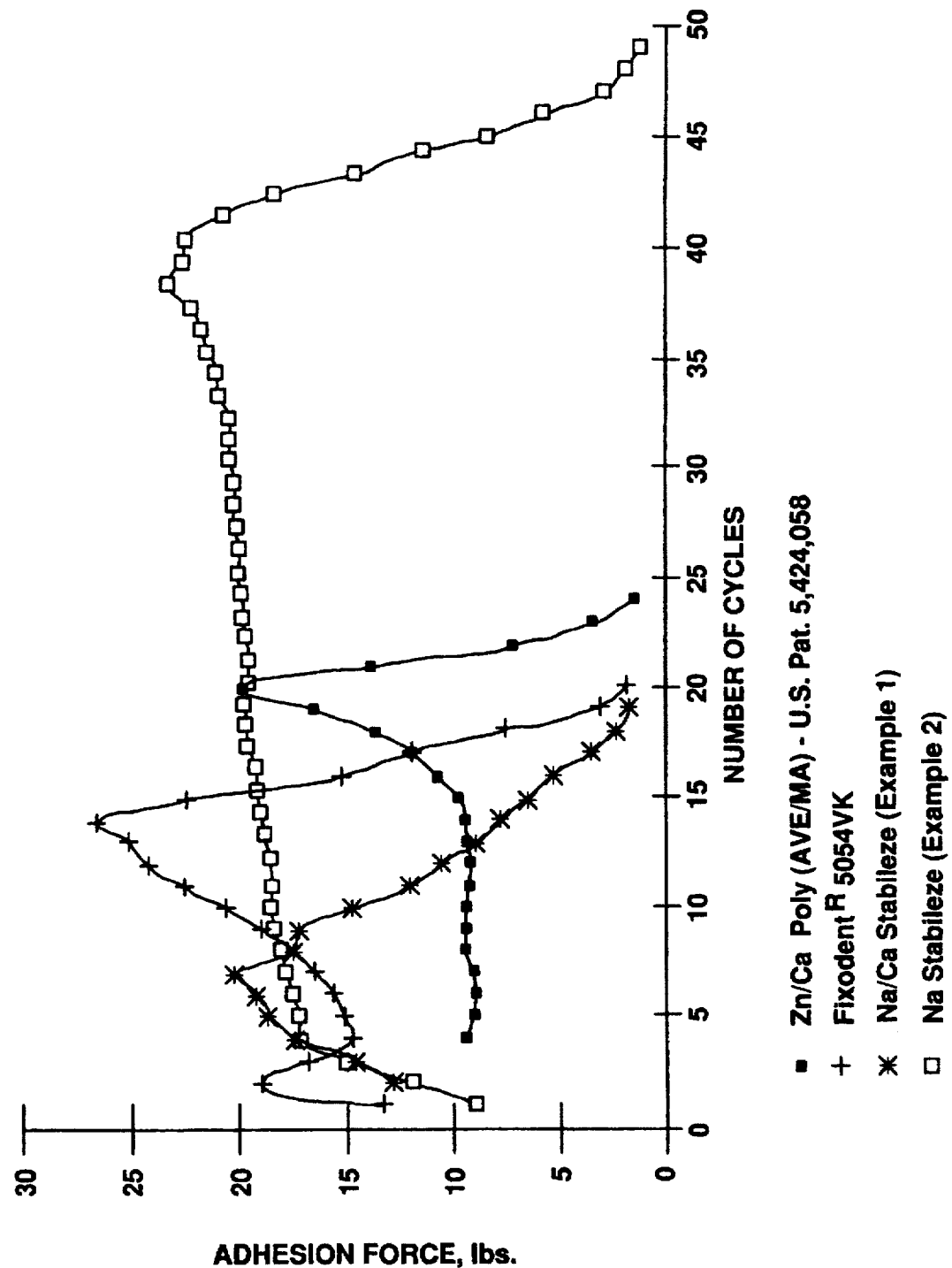

DENTURE ADHESIVE

BACKGROUND OF THE INVENTION

1. Field of the Invention

The present invention relates to a denture adhesive composition which provides extended effective holding power.

2. Description of the Prior Art

Various adhesive compositions have been employed for affixing dentures or ostomy devices to mucous membranes, several of which involve the use of methyl vinyl ether-maleic acid metal salts as disclosed in U.S. Pat. Nos. 3,003,988; 3,833,518; 3,868,339; 4,758,630; 4,183,914; 4,217,342; 4,217,343; 5,093,387; and 5,298,534. However, such denture adhesive compositions containing the copolymeric salts and/or cationic thickeners are found to be effective for only a limited time of not more than 8 hours and, in some instances, for as little as only 2–3 hours.

Accordingly it is an object of this invention to provide an improved adhesive composition which not only possesses extended holding power but also builds viscosity during use.

Another object is to provide an improved adhesive composition which is economical, easily prepared and which can be readily processed in commercial blending equipment.

These and other objects of this invention will become apparent from the following description and disclosure.

SUMMARY OF THE INVENTION

In accordance with this invention, there is provided an improved adhesive composition consisting essentially of (a) from about 10 to about 35 wt. % lower alkyl* vinyl ether-maleic acid copolymer wherein from about 0 to about 90% of the carboxyl units in the copolymer are converted to a mixture of metal salts, which metals are selected from the group consisting of calcium, sodium, strontium, zinc, magnesium and aluminum, potassium; (b) 10–30 wt. % of a terpolymer of a $C_1$ to $C_4$ alkyl vinyl ether, maleic anhydride and a $C_{10}$ to $C_{20}$ alkyl (meth)acrylate** or vinylether (dodecylvinylether) in a critical mole ratio of about 1–3:1:0.01–0.08, which terpolymer is 1 to 8% crosslinked with a $C_6$ to $C_{14}$ terminally unsaturated diene, e.g. decadiene;

\* lower alkyl as used herein is intended to mean alkyl containing from 1 to 4 carbon atoms
\*\* U.S. Pat. No. 5,362,789 (c) 10–35 wt. % of a cohesive agent; in a weight ratio of between about 2:1 and about 1:2 with respect to the copolymer; and (d) from about 30 to about 70 wt. % of an oil base as a carrier.

(a) The copolymer of the present composition has a number average molecular weight of between about 500,000 and about 3,000,000 and is defined as containing the repeating structure

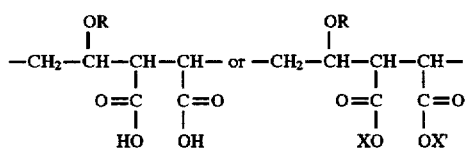

or a mixture thereof wherein R is $C_1$ to $C_4$ alkyl and X and X' is selected from the group of hydrogen, Ca, Na, Zn, Sr, Mg, Al,and K to form a metal salt mixture of a maleic acid/lower alkyl vinyl ether copolymer.

(b) The crosslinked terpolymers of this invention are those having a Brookfield viscosity of from about 10,000 to about 150,000 cps. Most preferred of this group are those terpolymers containing a mole ratio of from about 2 to about 2.5 methyl vinyl ether, 1 maleic anhydride and between about 0.03 and about 0.07 lauryl methacrylate or dodecylvinylether which is from 3 to 4% crosslinked and has a Brookfield viscosity of from about 20,000 to about 100,000 cps.

Preferred of this group is the methyl vinyl ether-maleic acid copolymer having a weight average molecular weight of between about 700,000 and about 2,000,000 wherein from 0.1 to 80% of the copolymer carboxyl units are converted to metal salt. The present copolymers from which the copolymeric salt mixtures may be derived are commercially available as GANTREZ® AN 149, 169 and 179, supplied by International Specialty Products. Most preferred of the mixed salts is the Ca/Na mixed salt.

Suitable acrylate monomers as described in U.S. Pat. No. 5,362,789 may be employed in the formation of the present terpolymers include decyl, dodecyl, tetradecyl, hexadecyl, octadecyl and eiscoyl acrylates and methacrylates; although $C_{10}$ to $C_{14}$ alkyl methacrylates are preferred. Similary $C_{10}$ to $C_{14}$ alkylvinylether may be used, e.g. dodecylvinylether.

Among the agents used for crosslinking, including 1,5-hexadiene, 1,6-heptadiene, 1,7-octadiene, 1,9-decadiene, 1,10-undecadiene, 1,11-dodecadiene and 1,13-tetradecadiene, the $C_8$ and $C_{12}$ dienes are preferred.

The present crosslinked terpolymer is prepared under anhydrous conditions by free radical polymerization with carefully controlled feed ratios which simulate the critical ratio of monomers in the desired crosslinked terpolymeric product. The free radical initiator concentration is maintained throughout the reaction at a concentration of between about 0.05 and about 1.5 weight %, preferably between about 0.2 and about 0.4 weight %, based on total monomers. In general, any of the known free radical polymerization initiators are suitably employed in the present invention, although optimum results are achieved with organic peroxides; t-butylperoxy pivalate, lauryl peroxide, t-amylperoxy pivalate, 2,5-dimethyl-2,5-di(t-butylperoxy) hexane and mixtures thereof being most effective. The most preferred initiator for the purpose of the invention is found to be t-butylperoxy pivalate.

In carrying out the polymerization, the crosslinking agent is dissolved in an organic solvent which is a 60:40 to 40:60 molar mixture of cyclohexane and a lower alkyl acetate to form a solution containing from about 10 to about 40 weight % solids which is needed to maintain a liquid phase reaction. The crosslinking solution is charged to a nitrogen purged reactor and heated to a temperature of from about 50° to about 90° C., preferably from about 55° to about 65° C., before the addition of the vinyl ether, anhydride and acrylate monomers. Under constant agitation, the monomers of the terpolymer are then gradually introduced to the heated solution by means of separate feeds over a period of from about 1 to about 8 hours, more often from about 3 to about 5 hours, with intermittent introduction of initiator so as to maintain close control of the monomeric molar ratio within the above described ranges throughout the reaction and to provide a constant rate of reaction in the system. After completion of the polymerization, the product mixture is held at the reaction temperature for an additional period, e.g. from about 1 to about 3 hours before cooling to room temperature. The crosslinked terpolymeric product in the required critical ratio is precipitated and the crude product recovered by conventional means. For example, the crude product can be withdrawn from the reactor as a slurry which is then filtered from solution to form a wet cake, dried to a powder and recovered in between about 80 and about 95% yield.

Except for the criticality of the monomeric proportions, many variations and alterations in the above procedure can be practiced without departing from the scope of the invention. For example, the addition of initiator can be monitored for constant incremental addition throughout the reaction. Also, it is desirable that the initiator be predissolved in one or both components of the solvent mixture before introduction into the reactor to assure more efficient contact of components. The individual monomers may also be predissolved in the solvent prior to entry into the reactor.

(c) Preferably, an added cohesive agent is used to augment the thickening properties of terpolymer (b) in the composition. Suitable cohesive agents include those described in U.S. Pat. No. 5,298,534, as well as carboxy methyl cellulose, and the like.

(d) The oil base employed as a carrier in the present composition can be any of the conventional oils suitable for medicinal purposes, including petrolatum, mineral oil, vegetable oils such as those derived from corn, soybean, cottonseed, castor bean, palm and coconut, as well as animal oils such as fish oil and oleic acid and mixtures thereof. The preferred carriers for this invention are mineral oil and petrolatum.

Colorants may also be used in the present invention and include pigments such as titanium dioxide or dyes suitable for food, drug and cosmetic applications. These colorants are known as F. D. & C. dyes. The materials acceptable for the foregoing spectrum of use are preferably water-soluble. Illustrative examples include indigo dye, known as F. D. & C. Blue No. 2, which is the disodium salt of 5,5-indigotindisulfonic acid. Similarly, the dye known as F. D. & C. Green No. 1, comprises a triphenylmethane dye and is the monosodium salt of the 4-[4N-ethyl-p-sulfobenzylamino) diphenylmethylene]-[1-N-ethyl-N-P-sulfo-benzyl)-2, 5-cyclohexadienimine]. Another useful colorant is F. D. & C. Red No. 3. A full recitation of F. D. & C. and D. & C. colorants and their corresponding chemical structures may be found in the Kirk-Othmer Encyclopedia of Chemical, Technology, 3rd Edition, in Volume 6, at pages 561–595.

Excipient additives are employed in small amounts of from about 0.001 to about 5 wt. % of the total composition.

The present adhesive compositions can be prepared by any of several well-known procedures. One process which is particularly recommended for the preparation of the present adhesive composition involves heating the oil base to a temperature of from about 170° to about 220° F., preferably a temperature of from about 80° to about 200° F., in a blender. Adding excipients to the hot oil base and then blending in the mixture the desired portion of polymers at a temperature of from about 160° to about 210° F., preferably from about 180° to about 190° F. The resulting mixture is then stirred until a uniform dispersion Is achieved, usually within a period of from 5 to 35 minutes, more often not more than 15 minutes.

After a uniform mixture is achieved, with continuous mixing, the dispersion is cooled to between about 50° and about 100° F., preferably to about room temperature, to form a cream-like gel with superior holding and viscosity building properties. It is to be understood that the initial viscosity of the present adhesive can be adjusted by regulating the amount of oil carrier or thickener employed.

Having generally described the invention, reference is now had to the following examples which illustrate preferred embodiments but are not to be construed as limiting to the scope of the invention as more broadly defined above and in the appended claims.

EXAMPLE 1

A sample of salt tolerant Stabileze was prepared according to U.S. Pat. No. 5,362,789, and was hydrolyzed in excess water at 85° C. for 2 hours. The pH was adjusted to about 6.5 with a 1% solution of $Ca(OH)_2$ and NaOH in a weight ratio of 2.8:1[$Ca(OH)_2$:NaOH]. The mixed Ca/Na salt was dried under vacuum to less than 15% moisture, milled, and sieved through a USS #100 sieve. This was then added to the denture adhesive formula in Table 1 using standard processing procedures.

EXAMPLE 2

Same as Example 1 except only 1% NaOH solution is used to make sodium salt. This was also added to the formulation in Table 1. Both formulations were evaluated for in-vitro adhesive performance using the Instron Universal Testing Machine technique described. Adhesive performance results are detailed in FIG. 1. Formula 2 gives excellent performance while formula 1 performs well but is still inferior in performance to standards.

TABLE 1

| | | Percent by Weight | |
|---|---|---|---|
| Raw Material | Control | Formula 1 (Example 1) | Formula 2 (Example 2) |
| Na/Ca STABILEZE | — | 20 | — |
| Na STABILEZE | — | — | 20 |
| Na/Ca Poly(AVE/MA) | — | 20 | 20 |
| Zn/Ca Poly(AVE/MA) | 40 | — | — |
| Carboxymethyl-Cellulose | 20 | 20 | 20 |
| LT Mineral oil | 20 | 20 | 20 |
| White Petrolatum | 20 | 20 | 20 |

INSTRON STUDIES FOR ADHESION

A small amount (~2g.) of denture adhesive is subjected to cyclic compressive and tensile stresses between two polymethylmethacrylate plates with computer controls.

The first step in running this test is to bring the plates together to obtain the zero position (A).

With this Instron settings determined, the upper plate was then raised high enough to spread 2 grams of sample uniformly over the top of the lower plate. Then 200 ml of simulated salivary fluid was added so that the sample was completely covered. The Instron crosshead is cycled between 10 pounds compression and 0.04 to record the compression and adhesion force.

At the end of the run, the upper plate motion was halted and the plate cleaned. The apparatus was thoroughly washed and dried in preparation for the next denture adhesive evaluation.

The saliva solution was changed for each denture adhesive. Each recording was analyzed and the adhesional forces (lbs.) for the cycles were recorded.

Extended holding power is generally measured on the X-axis. Strengthed hold is measured on the Y-axis. Initial gel tackiness is measured between 0 and 5 cycles. It is desirable that initial tack should be above 1.5 on the graph.

What is claimed is:

1. A denture adhesive composition comprising, by weight, (a) about 10–35 wt. % of a lower alkyl vinyl ether-maleic acid copolymer wherein from 0 to about 90 wt. % of the copolymer carboxyl units are converted to a mixture of salts selected from the group consisting of calcium, sodium, strontium, aluminum, zinc, magnesium and potassium; (b) 10–35 wt. % of a crosslinked terpolymer of a $C_1$ to $C_4$ alkyl vinyl ether, maleic anhydride and a $C_{16}$–$C_{20}$ alkyl acrylate or methacrylate, or vinyl ether; crosslinked with a $C_6$–$C_{14}$ diene, and their salts; (c) about 10–35 wt. % of a cohesive agent to augment the thickening properties of crosslinked terpolymer (b); in a weight ratio of between about 2:1 and about 1:2 with respect to the copolymer (a); and (d) from about 30 to about 70 wt. % of an oil base as a carrier.

2. A denture adhesive according to claim 1 wherein (b) includes a $C_{16}$–$C_{20}$ vinylether.

3. A denture adhesive according to claim 2 wherein (b) includes dodecylvinylether.

4. A denture adhesive according to claim 3 in which (a) is present in an amount of about 20 wt. %; and (b) is present in an amount of about 20 wt. %.

5. A denture adhesive according to claim 1 wherein the terpolymer has a mole ratio of about 1–3:1:0.01–0.08, respectively.

* * * * *